June 6, 1967  E. S. HANNIS ET AL  3,323,704
ALIGNMENT APPARATUS FOR SELF-SUPPORTING CABLE
Filed Sept. 8, 1965  3 Sheets-Sheet 3

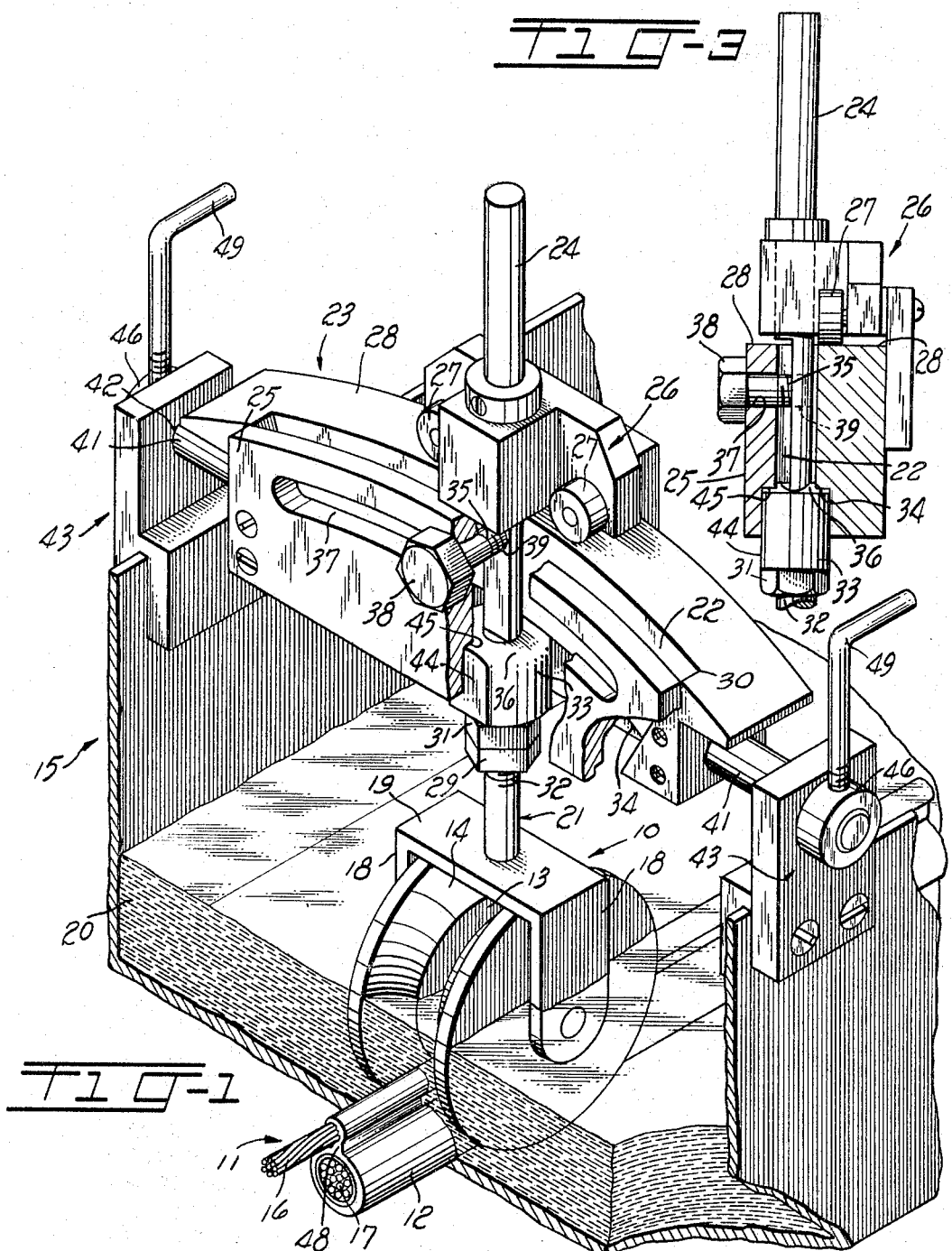

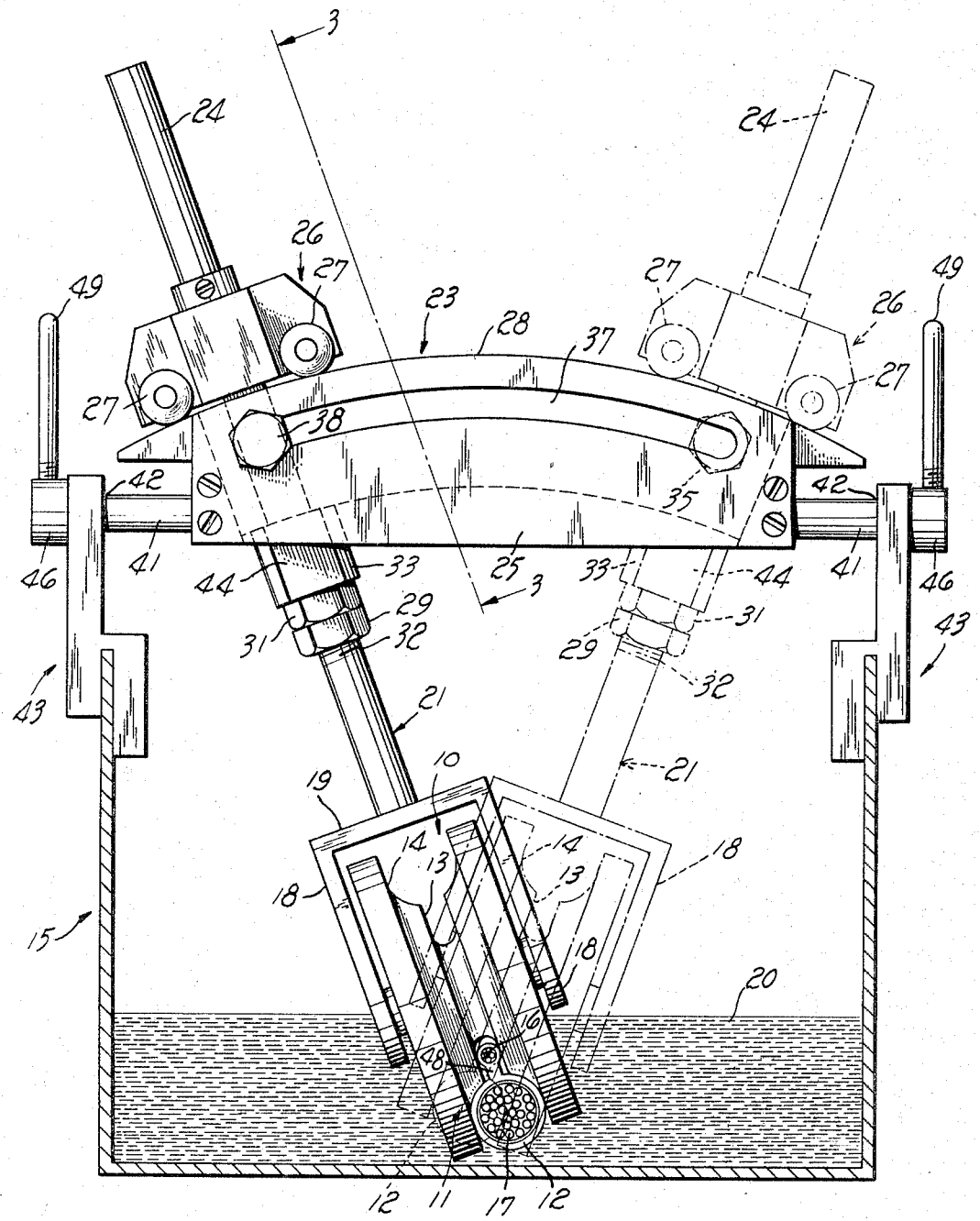

3,323,704
ALIGNMENT APPARATUS FOR SELF-SUPPORTING CABLE

Eugene S. Hannis, Hoboken, and Henry C. Slechta, Plainfield, N.J., assignors to Western Electric Company, Incorporated, New York, N.Y., a corporation of New York
Filed Sept. 8, 1965, Ser. No. 485,878
9 Claims. (Cl. 226—180)

This invention relates to alignment apparatus and particularly to apparatus for maintaining or correcting the alignment of the support strand and the cable core of a self-supporting cable during the manufacturing process.

Self-supporting cable of the type disclosed in the pending patent application of H. C. Slechta, Ser. No. 163,284, filed Dec. 29, 1961, now U.S. Patent No, 3,207,836 comprises a cable core surrounded by one or more protective sheaths, a support strand and an outer plastic jacket which encloses the sheathed core and support strand. The cable core and support strand are joined together in a precise dimensional relationship within the outer jacket by a connecting web of plastic material. In some instances, the support strand, such as a multiple-strand steel wire, tends to twist with respect to the core after the cable leaves the plastic extruding apparatus. Since the plastic sheath is in a pliable condition immediately after extrusion, the twisting movement of the strand reduces the web height between the core and support strand. These deviations from the cable design requirements might cause problems in handling and stringing the cable in the field. For example, the pole clamps which hold the cable between supports in the field are designed to grip the cable about the support strand. If the web height is less than a predetermined minimum due to misalignment of the support strand and cable core, the pole clamps would be unable to grip the cable properly and might even cut into the plastic jacket when tightened about the strand.

Prior art solutions for maintaining or correcting the alignment of the cable core and support strand of self-supporting cable concentrated on changes in the design of the extrusion die. The support strand and the core, however, were still movable with respect to each other while the outer plastic sheath remained in a pliable condition. Where the support strand tended to twist in a helical path along its length, the strand would move out of alignment with the core as the cable proceeded downstream from the extruder.

Accordingly, an object of this invention is to provde an apparatus for producing a self-supporting cable having a support strand and cable core in a predetermined dimensional relationship.

Another object of this invention is to provide an apparatus for maintaining or correcting the alignment of the support strand and the cable core of a self-supporting cable during manufacture.

A more specific object of this invention is to provide an apparatus for adjusting the position of the cable core with respect to the support strand of a self-supporting cable while the outer plastic sheath is in a pliable condiiton.

With the above and other objects and advantages in view, the present invention involves an apparatus for maintaining the alignment of the support strand and cable core of a self-supporting cable during manufacture comprising means for guiding the cable while the outer plastic sheath is in a pliable condition after an extrusion operation and means for adjusting the guiding means with respect to the support strand axis to maintain the desired relationship between the support strand and he cable core.

The invention includes a specially contoured guide roller which engages the self-supporting cable after extrusion of the outer plastic jacket and prevents deviations from the desired support strand-core relationship. As the cable exits from the extruder the plastic jacket is still warm and pliable. The adjustment cannot be made after the plastic, such as polyethylene, has set. The roller is rotatably mounted on a yoke carried at the lower end of an elongated shaft which extends upwardly through a slotted aperture in an arcuate supporting member. To correct misalignment of the strand and core, the shaft is moved along the slotted aperture with the support strand as the center of rotation. When he core and support strand are preporly aligned as indicated by a uniformly straight web in the finished cable, the shaft is then locked in position. The contoured roller forces the core of the self-supporting cable into the desired alignment with the strand before the plastic sets.

Other objects and advantages of the present invention will become more apparent when considering the following drawings wherein:

FIG. 1 is an isometric view of the invention showing a self-supporting cable being engaged by the unique alignment apparatus;

FIG. 2 shows a front view of the invention which illustrates various positions of the alignment apparatus;

FIG. 3 is a cross sectional view of the invention taken along the line 3—3 of FIG. 2;

Figure 4:
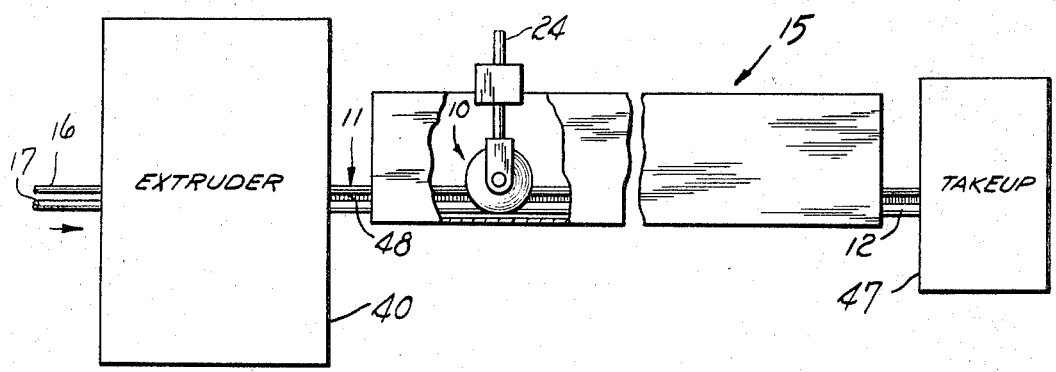
FIG. 4 shows a schematic diagram of the pertinent portion of the cable manufacturing process which includes the alignment apparatus.
Figure 5:
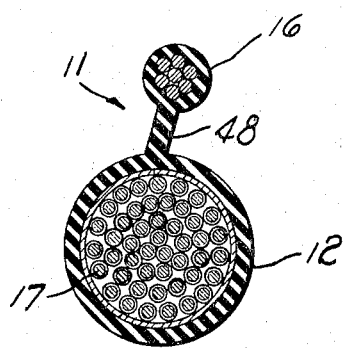
FIG. 5 shows an end view of a self-supporting cable illustrating a typical situation where the support strand is out of alignment with the cable core causing web distortion.

Referring now to the drawings, the invention comprises a specially contoured roller 10 for guiding a self-supporting cable 11 while the outer plastic jacket 12 is in a pliable condition within the cooling trough 15 immediately after an extrusion operation. The roller 10 which may be of a plastic material such as a phenol fabric includes inner and outer peripheral grooves 13 and 14 for engaging the support strand 16 and cable core 17, respectively, and maintaining their respective positions until the plastic sets. In instances where the support strand 16 develops a torque which would adversely affect the alignment of the strand 16 and core 17, see FIG. 5, the roller 10 may be adjusted to compensate for the helical twist of the strand by imparting a deliberate correction to the core position. As the cable 11 proceeds downstream in the cooling trough 15, the strand 16 gradually moves into alignment with the core 17. By precisely adjusting the position of the roller 10 it is, therefore, possible to guide the support strand 16 into alignment by the time the plastic material of the outer jacket 12 sets about the strand 16 and core 17.

The roller 10 is rotatably mounted between the arms 18—18 of a yoke-like structure 19 which is carried at the lower end of an elongated shaft 21 which extends upwardly through an aperture 22. The aperture 22 is formed at the recessed portion 30 of an arcuate supporting means comprising member 23 and a slotted face plate 25 which is mounted thereto.

The other end of the shaft 21 comprises an adjusting handle 24 for moving a carriage 26 mounted about an intermediate portion of the shaft 21 and having a plurality of rollers 27—27 extending therefrom to ride along the upper surface 28 of the arcuate member 23. The rollers 27—27 are maintained in contact with the curved surface 28 by a pair of locking nuts 29 and 31 which engage the threaded portion 32 of the shaft 21. The nuts 29 and 31 lock a bushing 33 having parallel side portions 44 within the aperture 22. The members 23 and 25 include lower cut-out portions 34 and 45, respectively, having a curved surface corresponding to the configuration of surface 28 to guide the upper portion 36 of the bushing 33 therealong.

The face plate 25 also includes a transverse slot 37 having an arcuate configuration corresponding to the upper surface 28. The shaft 21 may be fixed in a predetermined position with respect to the supporting member 23 by tightening clamping means such as bolt 38 against the face plate 25. The threaded portion 35 of bolt 38 extends through the slot 37 to engage a threaded aperture 39 in the shaft 21. Thus, the alignment apparatus 30 may be secured in a fixed position to provide the desired alignment between the support strand 16 and cable core 17. After an initial set-up operation the apparatus 30 may be permitted to function with only periodical adjustments whenever the support strand is changed.

The alignment apparatus is pivotally mounted approximately five feet from the extruder 40 and in a position straddling the cooling trough 15 with the roller 10 immersed within the cooling water 20. Shafts 41—41 on each end of the supporting member 23 are journaled within apertures 42—42 in the suports 43—43 to permit the roller 10 to pivot along the axis of the cable 11 during startup when the sheath 12 may be uneven due to bulges in the extruded plastic. In normal operation, the roller 10 is positioned beneath the water 20 to engage the cable 11 and is prevented from pivoting by the threaded locking means 49 which engage the shafts 41 within couplings 46.

To correct misalignment of the strand 16 and core 17 and consequent distortion of the web 48 while the sheath 12 is still in a pliable condition, the bolt 38 is loosened and the shaft 21 is moved within the transverse slot 37 with the strand 16 as the center of rotation. The core 17, therefore, is moved in an arcuate path to either side of the support strand 16 while the strand 16 remains stationary, see FIG. 2. The contoured roller 10 then forces the core 17 of the self-supporting cable 11 into alignment before the plastic hardens or imparts a compensating displacement to the core 17 which results in an aligned self-supporting cable 11 at the takeup 47.

It is to be understood that the above-described arrangements are simple illustrative examples of the application of the principles of the invention. Numerous other arrangements may be readily devised by those skilled in the art, which will embody the principles of the invention and fall within the spirit and scope thereof.

What is claimed is:

1. Apparatus for maintaining alignment of the support strand and the core of a self-supporting cable after an outer jacket has been extruded thereover comprising:
   a guide roller contoured to engage the jacket in the region of the support wire and in the region of the core, and
   means for supporting the roller for movement about an axis parallel to the cable to adjust the position of the core relative to the position of the support strand.

2. Apparatus according to claim 1 characterized in that: the supporting means for the roller is pivoted about the axis of the support strand.

3. An apparatus for maintaining the alignment of the support strand and cable core of a self-supporting cable after extrusion of an outer sheath thereover comprising:
   a guide roller including inner and outer peripheral grooves to engage the support strand and cable core respectively while the outer sheath is in a pliable condition, and
   adjusting means for changing the position of the cable core with respect to the support strand including:
      a shaft having the guide roller mounted on one end thereof,
      a supporting member having a slot through which an intermediate portion of the shaft extends, and
      means connecting the shaft to the supporting member to permit radial movement of the shaft about the strand axis to adjust the relationship between the core and support strand.

4. An apparatus according to claim 3 wherein the supporting member comprises:
   a first member having an arcuate upper surface to be engaged by the connecting means to guide the movement of the roller through the arcuate movement of the shaft, a recessed side portion and an arcuate lower portion, and
   a second member mounted to the first member to define a slot in conjunction with the recessed side portion of the first member and including an arcuate lower portion cooperating with the corresponding lower portion of the first member to aid in guiding the shaft therealong.

5. An apparatus according to claim 3 wherein the means connecting the shaft to the supporting member comprises:
   a rotatable carriage mounted to the shaft on the upper side of the supporting member and having at least one roller contacting the surface of the supporting member to guide the shaft therealong, and
   means mounted to the shaft on the other side of the supporting member to maintain the connecting means in contact therewith and aid in guiding the movement of the shaft.

6. An apparatus for producing a predetermined alignment between the support strand and the cable core of a self-supporting cable after an outer jacket has been positioned thereabout comprising:
   guiding means for engaging the cable core while the outer jacket is in a pliable condition, and
   means for moving the guiding means radially with respect to the support strand axis to force the core into a predetermined relationship with the strand, said means including:
      an arcuate supporting member, and
      a shaft coupled to the guiding means at one end and adjustably mounted within the arcuate supporting member for radial movement therealong.

7. An apparatus in accordance with claim 6 further including:
   means for pivotally mounting the arcuate supporting member with respect to the cable axis to permit movement of the guiding means in the direction of cable travel.

8. An apparatus in accordance with claim 6 further including:
   a member mounted about the shaft and having extending side portions on each side of the shaft and a roller mounted to each side portion, said rollers engaging the arcute supporting member to guide the shaft therealong, means mounted to the shaft on the opposite side of the arcuate supporting member for maintaining the rollers in contact therewith, and locking means for fixedly positioning the shaft with respect to the arcuate member to determine the position of the guiding means.

9. An apparatus in accordance with claim 6 wherein the arcuate supporting member comprises:

concentrically curved upper and lower portions having a slot extending therebetween the mounting an intermediate portion of the shaft.

References Cited

UNITED STATES PATENTS

| 1,933,073 | 10/1933 | Rich | 226—196 X |
| 2,512,335 | 6/1950 | Kholos | 226—196 X |
| 2,581,298 | 1/1952 | Roe | 254—190 |
| 3,175,282 | 3/1965 | Meeker | 254—135 X |
| 3,224,381 | 12/1965 | Stewart | 254—190 X |

M. HENSON WOOD, JR., *Primary Examiner.*

R. A. SCHACHER, *Assistant Examiner.*